March 4, 1924.
J. MICHELICH
CHARGER
Filed Dec. 26, 1923
1,485,407
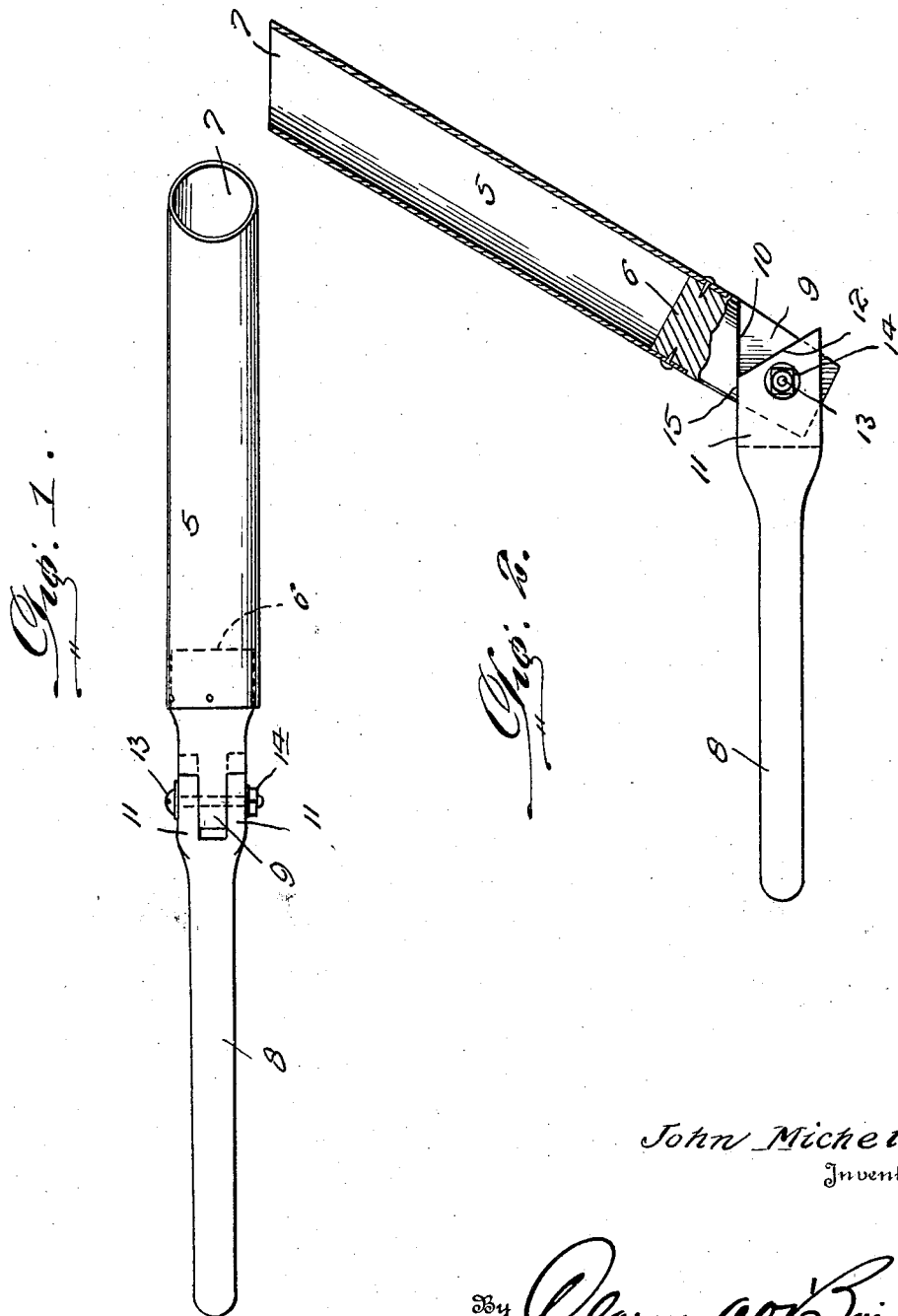
John Michelich
Inventor
By Clarence A. O'Brien
Attorney Patented Mar. 4, 1924.

1,485,407

UNITED STATES PATENT OFFICE.

JOHN MICHELICH, OF AUBURN, ILLINOIS.

CHARGER.

Application filed December 26, 1923. Serial No. 682,746.

*To all whom it may concern:*

Be it known that I, JOHN MICHELICH, citizen of the United States, residing at Auburn, in the county of Sangamon and State of Illinois, have invented certain new and useful Improvements in Chargers, of which the following is a specification.

This invention relates to improvements in chargers for supplying powder to drill holes for blasting.

The primary object of the invention is to provide a simple and inexpensive charger adapted to be readily and conveniently handled for supplying power to drill holes for blasting.

A further object of the invention is to provide a charger of the above kind embodying a tubular receptacle having a handle hingedly connected thereto, the hinged connection between the handle and the receptacle being such as to provide for the rigid support of the receptacle both when the receptacle is tilted to an angle relative to the other for facilitating charging of the receptacle and when the receptacle is disposed co-extensive with the handle when in the act of supplying powder to the drill hole.

A still further object of the invention is to provide a hinge connection between the receptacle and handle, by means of which the receptacle is maintained against movement relative to the handle except under manual operation thereof.

The invention consists in the construction and novel combination and arrangement of parts hereinafter more fully described, illustrated in the accompanying drawing, and claimed.

In the drawing, wherein like reference characters indicate corresponding parts in the two views:

Figure 1 is a top plan view of a charger constructed in accordance with the present invention.

Figure 2 is a longitudinal sectional view of the invention.

The invention embodies a tubular receptacle 5 preferably constructed of sheet metal and provided at its outer or lower end with a plug 6, forming a bottom for the receptacle. The outer or upper end of the receptacle is cut at an angle to form a tapering or spoon like extension 7, adapted for directing the blasting powder into the drill hole and to enable the blasting powder to be readily handled and poured into the holes without spilling or wasting it. This construction of the inner end of the receptacle also insures against spilling or wasting of the powder when the receptacle is tilted, as hereinafter set forth for facilitating filling of the receptacle with powder.

The receptacle has a handle 8 hingedly connected to its bottom, in such manner as to enable the receptacle to be firmly and safely held co-extensive with or at an angle relative to the handle to facilitate pouring of its contents into drill holes for blasting, without waste, or to facilitate filling of the receptacle. The plug 6 has an ear 9 projecting from the outer end thereof, and the outer end of the plug at opposite sides of this ear are disposed obliquely to the longitudinal axis of the plug and the receptacle as indicated at 10. The inner end of the handle 8 is bifurcated to provide a pair of legs 11, between which the ear 9 of the plug 6 snugly fits and the free end edges of the legs 11 are disposed obliquely to the longitudinal axis of the handle as indicated at 12, a bolt 13 being extended through the ear 9 and the legs 11 of the handle for pivotally connecting the receptacle with the handle. A nut 14 is threaded upon the end of the bolt 13 so as to retain the latter in place and insure frictional engagement between the adjacent surfaces of the legs 11 and the ear 9 whereby the receptacle may be maintained against accidental displacement when set at an angle or co-extensive therewith, manual movement of the receptacle, relative to the handle, about the pivot bolt 13 being, however, freely permitted. As shown clearly in Figure 2, the oblique end portion 10 of the plug 6 at opposite sides of the ear 9 are adapted to engage the side edges of the legs 11 as indicated at 15 when the receptacle is tilted at an angle to the handle so that the receptacle is firmly supported in a manner substantially the same as though the handle and receptacle were a single unit. It will also be seen that when the receptacle is swung so as to be co-extensive with the handle 8, the oblique edges 12 of the legs 11 will flatly engage the outer end portions 10 of the plug 6 so as to provide a firm support for the receptacle whereby the latter is maintained firmly in this position and prevented from tilting downwardly beyond a point wherein the receptacle and handle are in longitudinal alignment and co-extensive.

From the foregoing description, it is believed that the construction and operation as well as the advantages of the present construction will be readily understood and appreciated by those skilled in the art.

What I claim as new is:

1. A charger of the character described comprising a tubular receptacle, a handle, a friction hinged connection between the bottom of the receptacle and the handle, whereby the receptacle may be tilted to lie at an angle to or co-extensive with the handle and retained so tilted for facilitating filling of the receptacle for pouring of powder therefrom into drill holes, the bottom of said receptacle comprising a plug, and said hinged connection between the handle and the receptacle comprising an ear upon the outer end of the plug, and a pair of legs upon the inner end of the handle between which the plug ear is fitted, said hinged connection further embodying a pivot bolt passing through the handle legs and the plug ear.

2. A charger of the character described comprising a tubular receptacle, a handle, a friction hinged connection between the bottom of the receptacle and the handle, whereby the receptacle may be tilted to lie at an angle to or co-extensive with the handle and retained so tilted for facilitating filling of the receptacle for pouring of powder therefrom into drill holes, the bottom of said receptacle comprising a plug, and said hinged connection between the handle and the receptacle comprising an ear upon the outer end of the plug, a pair of legs upon the inner end of the handle between which the plug ear is fitted, said hinged connection further embodying a pivot bolt passing through the handle legs and the plug ear, the outer end of the plug at opposite sides of the plug ear and the inner end edges of the handle legs being provided with cooperating oblique walls adapted for positioning in contiguous relation when the handle and receptacle are co-extensive.

3. A charger of the character described comprising a tubular receptacle, a handle, a friction hinged connection between the bottom of the receptacle and the handle, whereby the receptacle may be tilted to lie at an angle to or co-extensive with the handle and retained so tilted for facilitating filling of the receptacle for pouring of powder therefrom into drill holes, the bottom of said receptacle comprising a plug, and said hinged connection between the handle and the receptacle comprising an ear upon the outer end of the plug, a pair of legs upon the inner end of the handle between which the plug ear is fitted, said hinged connection further embodying a pivot bolt passing through the handle legs and the plug ear, the outer end of the plug at opposite sides of the plug ear and the inner end edges of the handle legs being provided with cooperating oblique walls adapted for positioning in contiguous relation when the handle and receptacle are co-extensive, the oblique walls of the plug being adapted for contiguous engagement with the side edges of the handle leg to steady the receptacle when the latter is tilted at an angle to the handle.

4. A charger of the character described comprising a tubular receptacle, a plug forming the bottom of said receptacle, a handle, and a friction hinged connection between the bottom of the receptacle and the handle, whereby the receptacle may be tilted to lie at an angle to or co-extensive with the handle and retained so tilted for facilitating filling of the receptacle for pouring of powder therefrom into drill holes, the plug and handle having co-operating surfaces adapted for association in contiguous relation when the handle and receptacle are co-extensive.

5. A charger of the character described comprising a tubular receptacle, a plug forming the bottom of said receptacle, a handle, and a friction hinged connection between the bottom of the receptacle and the handle, whereby the receptacle may be tilted to lie at an angle to or co-extensive with the handle and retained so tilted for facilitating filling of the receptacle for pouring of powder therefrom into drill holes, the plug and handle having co-operating surfaces adapted for association in contiguous relation when the handle and receptacle are co-extensive, and when the handle and receptacle are disposed at an angle to each other.

In testimony whereof I affix my signature.

JOHN MICHELICH.